(12) United States Patent
Cohen et al.

(10) Patent No.: US 6,560,576 B1
(45) Date of Patent: May 6, 2003

(54) METHOD AND APPARATUS FOR PROVIDING ACTIVE HELP TO A USER OF A VOICE-ENABLED APPLICATION

(75) Inventors: Michael H. Cohen, Burlingame, CA (US); Jennifer E. Balogh, Fremont, CA (US); Tracy D. Wax, Brisbane, CA (US); Madhavan S. Thirumalai, Palo Alto, CA (US); Debajit Ghosh, Sunnyvale, CA (US)

(73) Assignee: Nuance Communications, Menlo Park, CA (US)

( * ) Notice: Subject to any disclaimer, the term of this patent is extended or adjusted under 35 U.S.C. 154(b) by 0 days.

(21) Appl. No.: 09/557,988

(22) Filed: Apr. 25, 2000

(51) Int. Cl.$^7$ .............................................. G10L 21/00
(52) U.S. Cl. ...................................... 704/270; 704/275
(58) Field of Search ................................ 704/270, 275; 379/88.22, 93.12

(56) References Cited

U.S. PATENT DOCUMENTS

| | | | | |
|---|---|---|---|---|
| 5,915,001 A | * | 6/1999 | Uppaluru | 379/88.22 |
| 6,061,433 A | * | 5/2000 | Polcyn et al. | 370/93.12 |
| 6,185,535 B1 | * | 2/2001 | Hedin et al. | 704/270 |
| 6,314,402 B1 | * | 11/2001 | Monaco et al. | 704/275 |
| 6,385,583 B1 | * | 5/2002 | Ladd et al. | 704/270 |
| 6,400,806 B1 | * | 6/2002 | Uppaluru | 379/88.22 |
| 6,269,336 B1 | * | 7/2002 | Ladd et al. | 704/270 |

OTHER PUBLICATIONS

Michael H. Cohen, et al., "Dialog Design Principles for Spoken Language Systems", Nuance Communications, Menlo Park, California, Sep. 22, 1999, pp. 1–34.

* cited by examiner

Primary Examiner—Susan McFadden
(74) Attorney, Agent, or Firm—Blakely, Sokoloff, Taylor & Zafman LLP; Jordan M. Becker

(57) ABSTRACT

A voice-enabled application, which may be a voice browser, is configured to provide active help to a user. The application maintains a usage history of each user with respect to dialog states. The usage history includes various user-specific variables, some of which are valid across multiple sessions. The application maintains a number of active help prompts capable of being played to a user as speech, each containing information on a different, specific help topic. The application further maintains a number of sets of conditions, each set corresponding to a different one of the active help prompts. The application monitors dialog states during a session of a user and generates an event based on the dialog states. The application applies certain ones of the conditions to certain ones of the user-specific variables in response to the event. The application then plays a active help prompt containing information on a specific help topic to the user if the applied conditions are satisfied.

51 Claims, 5 Drawing Sheets

METHOD AND APPARATUS FOR PROVIDING ACTIVE HELP TO A USER OF A VOICE-ENABLED APPLICATION

FIELD OF THE INVENTION

The present invention pertains to speech recognition systems. More particularly, the present invention relates to techniques for providing help to a user of a voice-enabled application.

BACKGROUND OF THE INVENTION

Users of a software application may require instruction about the features of the application and how to use its capabilities most effectively. This may be particularly true for applications associated with emerging technologies, an example of which is speech recognition. Such applications include voice-enabled applications. A "voice-enabled" application may be defined as an application which uses automatic speech recognition to recognize and respond to a user's speech and, optionally, which provides audible prompts to the user in the form of recorded and/or synthesized speech, or the like.

Instruction sheets sent through the mail and reminder cards with lists of commands generally are not very effective—most users will not have read the instructions before attempting to use the application. Hence, it is desirable for such applications to be self-explanatory. In particular, it should be possible for inexperienced users to get all the help they need while actually using the application.

Software applications have long been designed with built-in help features to assist their users. Some applications offer new users online tutorials, demos, or a combination of both. The option of hearing a tutorial is typically offered the first time a user accesses the system—this approach is mainly used in subscription services or services that expect repeated use (e.g., personal agents, banking or brokerage account access, etc.). A tutorial is generally a sequence of audio and/or visual lessons provided by the application and designed to familiarize the user with the important features of the application. A demo generally is a recorded interaction between a user and the application which mimics actual use of the system. Another common help feature is a "wizard", which is an interactive help utility that guides the user through each step or aspect of a particular feature. In addition, many applications provide a help index, using which the user can look up information on a given feature.

For certain applications, however, these common help approaches have shortcomings. The tutorial or demo approach is of limited value when a large amount of functionality needs to be described. A user will have difficulty following a lengthy description of diverse functionality. In addition, if a feature is not immediately exercised, it is likely to be forgotten. Often users do not have the patience to listen to a lengthy description, especially if it is not helping them meet their immediate needs. Further, many users also lack the patience and/or knowledge to activate a wizard or to look for a feature in a help index during use of an application.

In the context of certain voice-enabled applications, these problems can be exacerbated by the fact that a given voice-enabled application may be designed to communicate with a user audibly, and not visually. Information presented audibly tends to be much more transitory than information presented visually and is therefore more easily forgotten.

SUMMARY OF THE INVENTION

The present invention includes a method and apparatus for providing active help to a user of a voice-enabled application. A usage history of the user is maintained, which includes various user-specific variables. One or more conditions are checked using one or more of the user-specific variables in response to speech from the user. A prompt containing information on a specific help topic is then played to the user in response to the one or more conditions being satisfied.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
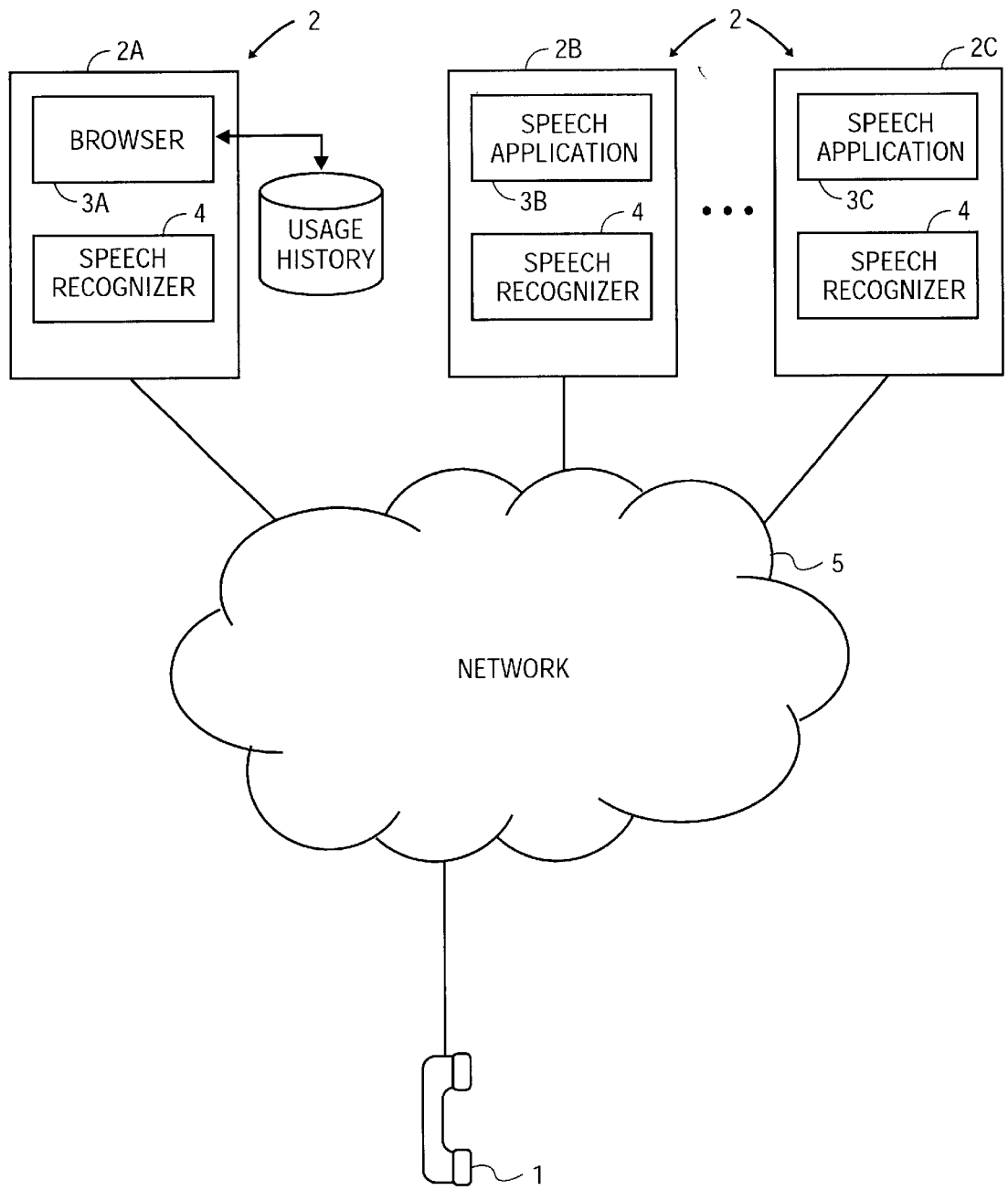
FIG. 1 illustrates shows a network of voice-enabled sites, including a voice browser.

A method and apparatus for providing active help to a user of a voice-enabled application are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art.

The active help techniques described herein may be used advantageously in a voice-enabled application. One example of a voice-enabled application is a voice browser, described further below. To facilitate description, the active help techniques are described below in the context of a voice browser. Note, however, that many if not all of these techniques can be applied to other types of voice-enabled applications, as well as in other contexts.

The World Wide Web is a well-known computer network-based resource that is used by millions of people every day for many purposes, including entertainment, research, shopping, banking, and travel reservations, to name just a few. Along with rapid advances in speech recognition technology, rapid advances are also occurring in the development of a voice-based analogue to the World Wide Web, i.e., a "Voice Web", a large-scale network of hyperlinked, voice-enabled content sites. Sites on the Voice Web will implement automatic speech recognition, so that a person can access content (e.g., voice-enabled applications and information) on the sites using speech. For example, a user might access content on a Voice Web site using a conventional telephone or a voice-enabled personal computer (PC). The content may include various voice-enabled software applications, which respond to a user's recognized speech and generate prompts that are played to a user as recorded or synthesized speech.

A user may access voice-enabled content on the Voice Web using a voice browser. A voice browser is a privileged type of voice-enabled software application that, in cooperation with a speech recognizer, allows the user to request, retrieve, navigate through, and store information from a Voice Web using speech. An example of a voice browser is described in U.S. patent application Ser. No. 09/203,155, entitled, "System and Method for Browsing a Voice Web," filed on Dec. 1, 1998, which is incorporated by reference herein in its entirety. A voice browser allows navigation on the Voice Web in a manner analogous to how a conventional browser, such as Netscape Navigator or Microsoft Explorer, allows navigation on the World Wide Web. Voice-enabled content (or "voice content") on the Voice Web may be organized into discrete, separately-identifiable "dialog units" provided by various Voice Content Sites (VCSs), which are analogous to conventional hypertext web pages provided by conventional web sites. These dialog units may therefore also be referred to as "voice pages". The user can access these voice pages using the voice browser with standard hyperlink navigation techniques (e.g., using "bookmarks" or "favorites", "go forward" command, "go back" command, etc.). The hyperlinks that connect the voice pages may be implemented using any of a variety of techniques, such as "earcons" or "voice links" (words or phrases that a user must speak to access particular voice pages) or Dual-Tone Multiple Frequency (DTMF) tones.

As described in greater detail below, a voice browser (or other application) may be configured to provide active help to a user. The basic idea behind the techniques described herein is to provide only the instruction relevant to the task immediately at hand, just before the user needs to perform the task. As a result, the amount of new information provided to the user at that time is small and is immediately used, in contrast with some conventional help approaches. Consequently, the information is more likely to be remembered. The pattern of the user's usage in addition to history tracking across sessions dictates when active help prompts are most useful to the caller and, therefore, when they are played. Active help prompts may be played a configurable maximum number of times, so that the user can learn the needed information but is not forced to listen to the information repeatedly. This approach enables users to learn how to use a speech system without having to listen to long instructions or to memorize commands before the user needs to use them.

In one embodiment, the voice browser maintains a usage history of each user. The usage history includes a history of dialog states and includes various user-specific variables, some of which persist across multiple sessions. A "session" is defined herein to be specific to a particular user. The voice browser has access to a number of active help prompts capable of being played to a user as speech, each containing information on a different, specific help topic. Note that as used herein, the term "prompt" does not imply that a response from the user is necessarily being solicited; rather, the term refers to any form of speech presented to the user by a machine during a dialog between the user and the machine. The active help prompts are categorized as either novice active help prompts or expert active help prompts, with each category including subcategories of active help prompts. Each category or subcategory of active help prompts is applied under different types of circumstances. Accordingly, the browser further maintains and applies various sets of conditions, each set of conditions corresponding to a different active help prompt. The prompts within each category or subcategory generally have one or more conditions in common, to determine when the prompts get played. The voice browser monitors dialog states during a session and detects events based on the dialog states. The voice browser checks certain conditions using certain user-specific variables in response to detecting an event. The voice browser then plays an active help prompt containing information on a specific help topic to the user for any applied set of conditions that is satisfied in response to the event.

Referring now to FIG. 1, a network of voice-enabled sites is shown, which includes a voice browser embodying the active help techniques. Note, however, the particular architecture in which the active help techniques are implemented is not important—any of a variety of different architectures may be used. The user of a telephone 1 ("caller") uses the telephone 1 to obtain voice access to a number of server systems 2 on a network 5. Note that the caller may use a computer system equipped with a microphone to do this, rather than a conventional telephone. The server systems 2 include various forms of voice-enabled content and are therefore referred to as voice content sites. Each server system 2 includes at least one voice-enabled application 3, which in the case of server system 2A is a voice browser 3A such as described above. The voice browser 3A facilitates the caller's access to the other voice content sites, i.e., to voice-enabled applications 3B, 3C, etc., and allows the caller to navigate through voice content on those sites and other sites on the network 5. The applications 3B and 3C may be any of a variety of types of applications. As an example, applications 3B and 3C might be designed to allow the caller to make travel reservations or to manage investments, in each case using speech and without human assistance.

Server system 2A of the voice browser 3A also includes a speech recognition engine ("speech recognizer") 4, which recognizes speech of the caller. Optionally, the other server systems may also include their own respective speech recognition engines. However, the speech recognizer 4 in the browser's content site 2A may provide speech recognition services on behalf of the other content sites on the network 5. Of course, each of the server systems 2 may support multiple callers.

The network 5 may be any conventional communication network, or it may be a combination of two or more different types of conventional networks. Hence, network 5 may include any one or more of: a public switched telephone network (PSTN); a wide area network (WAN), such as the Internet; a local area network (LAN); etc. As one example, the caller may access the voice browser 3A using a direct dial connection through the PSTN using telephone 1. The voice browser 3A may be connected to the other content sites through the PSTN or through the Internet, or through any other network or a combination of networks. Thus, the particular architecture in which the active help techniques are implemented is not important, and again, these techniques also need not be implemented in a voice browser.

Figure 2:
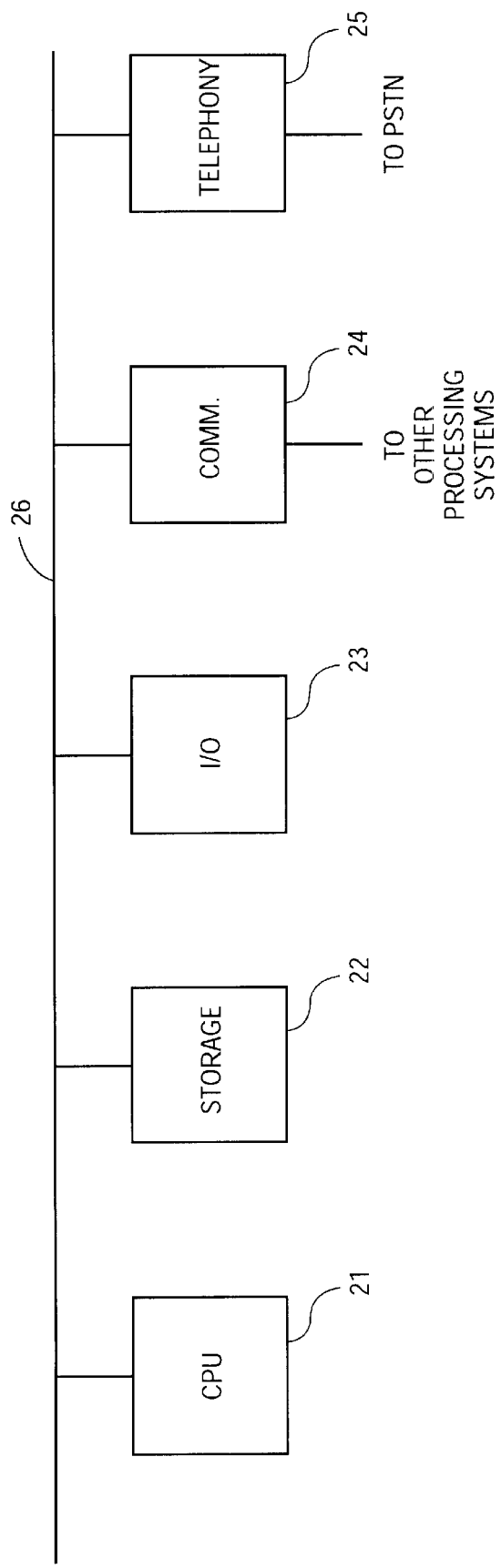
FIG. 2 is a high-level block diagram of a computer system.

Each of the server systems 2 may be implemented in the form of one or more conventional computer systems, such as a personal computer (PC), workstation, or the like. Any of the server systems 2 may actually be distributed across multiple physical machines. FIG. 2 is a high-level block diagram of one such computer system that may be used to implement any of the server systems 2. Also, the telephone 1 of the user may be replaced by audio components (not shown) of such a computer system, e.g., a microphone and sound card. As shown, the computer system includes a microprocessor 21, i.e., a Central Processing Unit (CPU), data and/or instruction storage 22, one or more input/output (I/O) devices 23, a data communication device 24, and a telephony interface 26 all coupled to each other by a bus system 26.

Storage 22 represents any one or more of components such as: Random Access Memory (RAM), Read-only Memory (ROM), or a mass storage device (e.g., magnetic disk or tape, magneto-optical (MO) storage device, flash memory, any of various types of Digital Versatile Disk (DVD) or compact disk (CD) storage, etc.). The bus system 26 may include one or more physical buses coupled to each other through one or more bridges, controllers and/or adapters. For example, the bus system 26 may include a "system bus" coupling the microprocessor 21 to RAM and coupled to one or more peripheral buses, such as a Peripheral Component Interconnect (PCI) bus or the like. The data communication device 24 may be any device suitable for enabling the computer system to communicate data with another computer system or other type of processing system over a data communication link; hence, the data communication device 24 may be, for example, a conventional telephone modem, a cable modem, an Integrated Services Digital Network (ISDN) adapter, a Digital Subscriber Line (DSL) modem, an Ethernet adapter, etc. The telephony interface 25 is used to connect the computer system to the PSTN, e.g., for purposes of providing a direct voice link with a caller. The telephony interface may include an audio front-end to sample and filter the caller's speech and an endpointer to identify endpoints of a caller's utterances. Such devices are well-known in speech recognition technology. The one or more I/O devices 23 may include, for example, any of the following, depending on how the system is to be used: a pointing device, such as a mouse, trackball, touchpad, etc.; a display device, such as a Cathode Ray Tube (CRT), a Liquid Crystal Display (LCD), or the like; a microphone with associated audio processing circuitry; audio speakers; etc. Of course, such I/O devices 23 may be omitted if the system requires no direct user interface.

It will be recognized, therefore, that the active help techniques described herein may implemented, at least in part, in software, for example as part of the voice browser 3A and/or other software executing on the server system 2A. That is, the acts described herein associated with the active help techniques may be performed by a microprocessor or the like executing sequences of software instructions. Alternatively, these acts may be caused by hardwired circuitry, or a combination of software and hardwired circuitry. Accordingly, the techniques and apparatus described herein are not limited to any particular combination of hardware and/or software.

Active help prompts may be grouped into two categories: novice and expert. Novice active help prompts are those that are played the first time a caller encounters a given feature of the system (e.g., of the voice browser). Expert active help prompts are those that are played when the caller is more experienced and is ready to learn about more-sophisticated features. In one embodiment, multiple novice active help prompts can be played per session, while no more than one expert active help prompt is played per session. Also, it may be desirable to configure the system so that each active help prompt is played no more than once to any given caller.

Novice active help prompts and expert active help prompts each may be further grouped into two subcategories. Novice active help prompts include "head's up" prompts and "novice instruction" prompts. Head's up prompts are used the first time the caller has encountered an area of the application, such as personal profiles, or the first time the caller must do a particular task, such as enrolling in the system or accessing a list of bookmarks (see discussion of bookmarks below). These prompts inform the caller what is about to happen and or provide useful commands needed for the immediate task. Novice instruction prompts are prompts used the first time the caller has completed some action and needs to know what follow-up action to take.

Expert active help prompts may include "shortcut" prompts and "unused feature" prompts. Shortcut prompts are targeted for callers who have experience with the system but could benefit from learning to use the system more efficiently. In particular, shortcut prompts are used when the caller may not be aware that the task at hand can be done in an easier way. An example of this situation is now described in the context of "bookmarks". A voice browser may provide the user with the ability to create a tag that marks a particular place in a dialog, so that the caller can revisit this place in the future simply by saying the name of the tag. Such a tag is referred to as a "bookmark", and the user may build a list of such bookmarks. There may be a section which allows the caller to manage his or her bookmarks. From a main bookmark menu, the caller may add, delete, or list bookmarks. In this respect, bookmarks are analogous to the bookmarks or favorites functions provided by conventional browsers.

Assume that every time a given caller wanted to delete a bookmark, he believed he needed to say "bookmarks" to access the bookmark menu, and then to say "delete a bookmark". Accordingly, a shortcut active help prompt might be set up to be played to the caller (after three sessions, for example), in response to the foregoing sequence of commands, explaining that the "delete a bookmark" command can be used from the main menu.

Unused feature active help prompts are used when a caller is not using an available feature but the caller's usage patterns suggest that this feature would be beneficial. Hence, unused feature prompts instruct a caller how to use a feature of the system not previously used by that caller.

Figure 3:
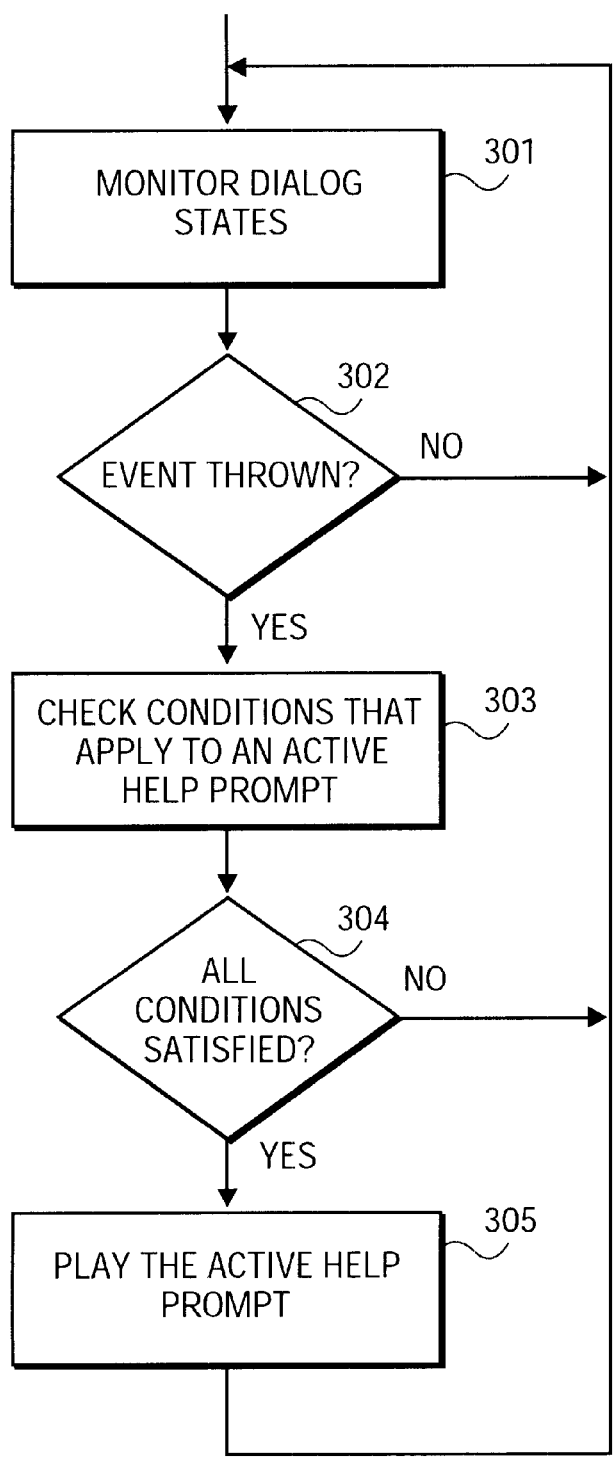
FIG. 3 is a flow diagram showing a process for providing active help to a user.

In a speech recognition based system, there is interaction between the system and the caller. Each time the system prompts the user, a response may be expected from the caller. This single interchange, starting with a prompt and ending with either the caller's response or an action that does not require a response, is referred to herein as a "dialog state". Referring to FIG. 3, the conditions under which the active help prompts are triggered may be made to depend on which dialog state the caller has reached. In one embodiment, dialog states are detected by using one or more event listeners, described further below. The event listeners monitor dialog states at 301. Each event listener is configured to detect at 302 an event "thrown" (i.e., signaled or generated) in response to a specified dialog state being entered or exited, or in response to a specified transition between dialog states. In response to the event being thrown, the listener checks a predefined set of conditions that apply to an active help prompt at 303. If all conditions are satisfied (304), then the active help prompt is played to the caller at 305.

In an implementation using the Java programming language, the aforementioned event listeners may be implemented as Java interfaces. Essentially any object can be a listener for any event, as long as the object implements the appropriate interface. Event listener interfaces extend the interface java.util.EventListener, which is an empty interface. The naming convention is: FooListener. Hence, the following is an example of an event listener interface in Java:

```
public interface FooListener extends java.util.EventListener
{
    public void fooHappened(FooEvent event);
}
An example of an event listener implementation in Java is as follows:
public class MyClass
implements FooListener
{
    public void fooHappened(FooEvent event) {
        System.out.println("Foo happened!");
    }
}
```

In an alternative embodiment, the conditions are applied in response to keywords being spoken by the caller, rather than being based on dialog states. That is, the output of a speech recognizer is continuously compared with a predefined set of utterances. Each active help prompt and its corresponding conditions is associated with one or more predefined utterances. If a predefined utterance is detected, the set of conditions for that utterance are applied. If the conditions are satisfied, the active help prompt corresponding to that set of conditions is played.

The active help techniques described herein may be generated using "speech objects". A speech object is a component for controlling a discrete piece of conversational dialog between a speaker and a system. Techniques for creating and using such speech objects are described in detail in U.S. patent application Ser. No. 09/296,191, filed on Apr. 23, 1999, and entitled, "Method and Apparatus for Creating Modifiable and Combinable Speech Objects for Acquiring Information from a Speaker in an Interactive Voice Response System," of Monaco et al. ("Monaco"), which is incorporated herein by reference in its entirety. As described in Monaco, speech objects can be used hierarchically. A speech object may be a user-extensible class, or an instantiation of such a class, defined in an object-oriented programming language, such as Java or C++. Accordingly, speech objects may be reusable software components, such as JavaBeans. Therefore, according to one embodiment, active help is provided by the voice browser calling, either automatically or explicitly, an active help speech object when an active help prompt is appropriate.

Monaco describes the use of a class called SODialogManager, which may be used among other things to create compound speech objects. Accordingly, a class VSOActiveHelp may be defined as a subclass of SODialogManager. VSOActiveHelp can be configured to be called automatically when a given dialog state is entered, exited, or when a particular change in dialog state occurs. An alternative is to explicitly call VSOActiveHelp and explicitly specify the current dialog state. Hence, a sample invocation of VSOActiveHelp using the latter approach is as follows:

// specify that we are at "my point" in dialog state "my state" VSOActiveHelp.activePoint("my state", "my point", sc, dc, cs);

To simplify the implementation, the following two macros may also be provided:

// specifying that we are entering dialog state "my state" VSOActiveHelp.enterState( "my state", sc, dc, cs);

// specifying that we're entering state "my state" VSOActiveHelp.enterState( "my state", sc, dc, cs);

In the above examples, "sc", "dc, and "cs" represent the SpeechChannel, DialogContext, and CallState objects, respectively.

Although VSOActiveHelp is described as a subclass of SODialogManager, VSOActiveHelp need not use SODialogManager's linear traversal of the possible transitions. Instead, VSOActiveHelp may use a hash table for storing information to find the set of transitions applicable to the current {state, point} tuple. From there, the VSOActiveHelp object can start evaluating the conditions one after the other and execute the actions for each condition that is met. VSOActiveHelp may be configured via a properties file that stores the condition variables.

As noted, the voice browser maintains a usage history of each user, as shown in FIG. 1. The usage history tracks the dialog states of the user and includes a number of user-specific variables, described further below, some of which persist across multiple sessions. Some of the above-noted conditions are based on the states of these variables. The variables may be stored in any conventional storage device, either locally (e.g., within the voice browser) or remotely, and in any conventional format. Examples of the variables that are used and which persist across sessions include the following:

the number of sessions a given user has had with the voice browser (integer type);

an indication of whether that prompt has been played (Boolean type);

the number preloaded bookmarks (also known as "favorites") (integer);

the number of bookmarks in the user's bookmarks list (integer);

the number of times the user has added a bookmark (e.g., by saying "bookmarks" followed by the name of a bookmark) (integer);

the number of times the user has deleted a bookmark (e.g., by saying "bookmarks delete") (integer);

the number of times the user has accessed his list of bookmarks (e.g., by saying "bookmarks list") (integer);

for each navigation command, such as "go back" and "go forward", an indication of whether the user has used the command before (Boolean); and an indication of whether the user has items in his user profile (Boolean).

In addition, the voice browser may also maintain certain variables that do not persist beyond a given session. These variables may include, for example:

an indication of which dialog unit the user has most recently accessed prior to the current dialog unit (string type);

whether an expert active help prompt has been played during the session (Boolean);

the number of times the user has used the browser to request any type of content during the session (integer);

for a given bookmark, an indication of whether the caller has said the same bookmark before during the session (Boolean);

an indication of whether a given bookmark is in the history list (Boolean); and the number of items in the history list (integer).

Figure 4:
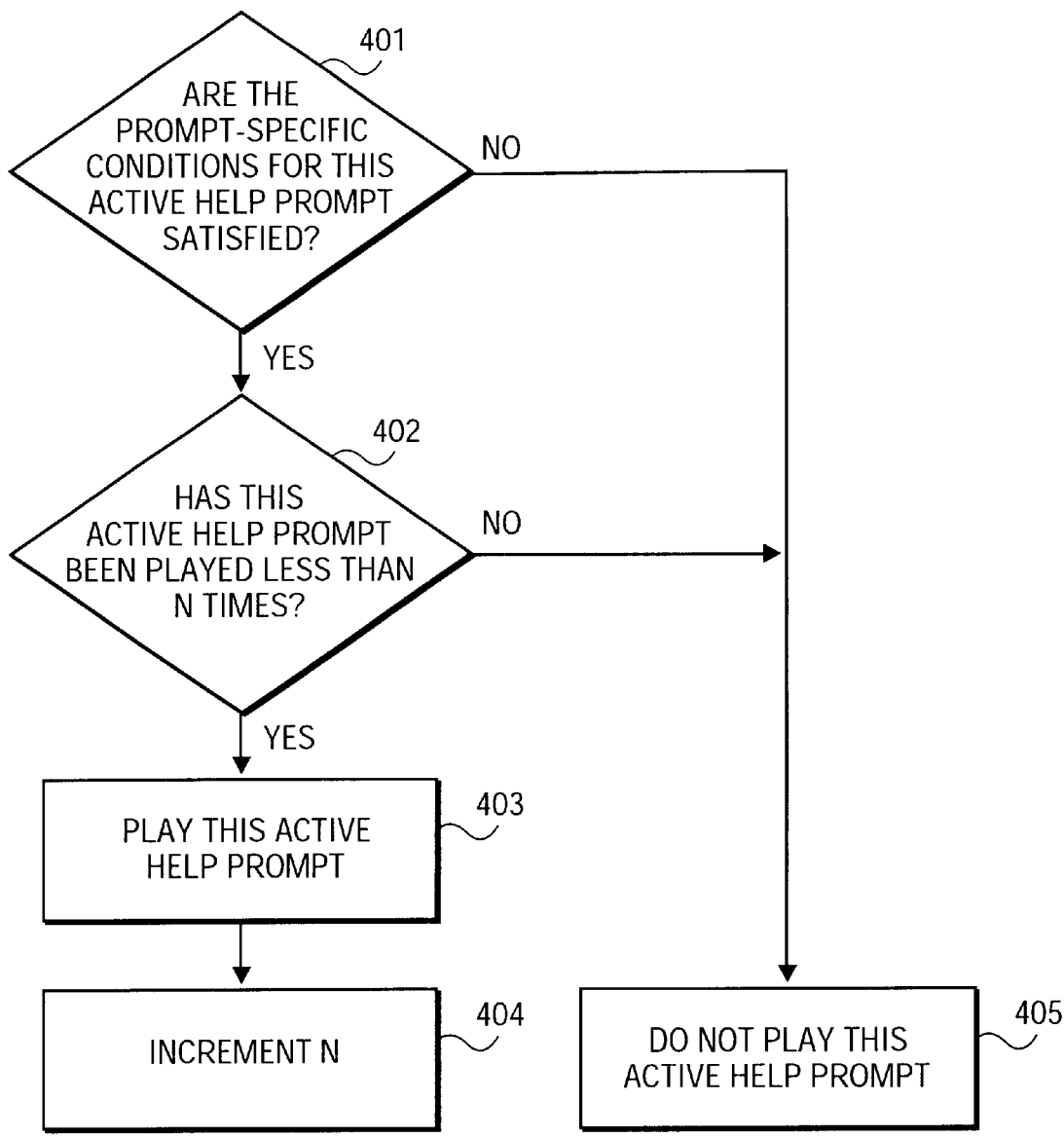
FIG. 4 is a flow diagram showing a process by which a novice active help prompt may be played.

FIG. 4 shows one process that may be performed, according to which a novice active help prompt may be played. The illustrated process is set forth in terms of a generic, novice active help prompt; specific examples of novice active help prompts are described below. At 401, conditions that are specific to the active help prompt, if any, are applied. Note, however, that certain active help prompts might have no prompt-specific conditions other than the number of times the active help prompt has been played (402). In addition, some active help prompts may have other conditions that are not prompt-specific, such as what session the caller is on. The prompt-specific conditions may be applied by an event listener in response to an event being thrown, which in turn may be based on dialog states or other criteria, as described above. If the prompt-specific conditions are satisfied, then at 402 a determination is made of whether this prompt has previously been played fewer than N times, where N is a predetermined, configurable number (e.g., one). If the active help prompt has been played fewer than N times, the prompt is played at 403, and N is incremented by one at 404. If the prompt-specific conditions are not satisfied at 401, or the active help prompt has been played before N or more times (402), then the active help prompt is not played in response to the current triggering event (405).

Figure 5:
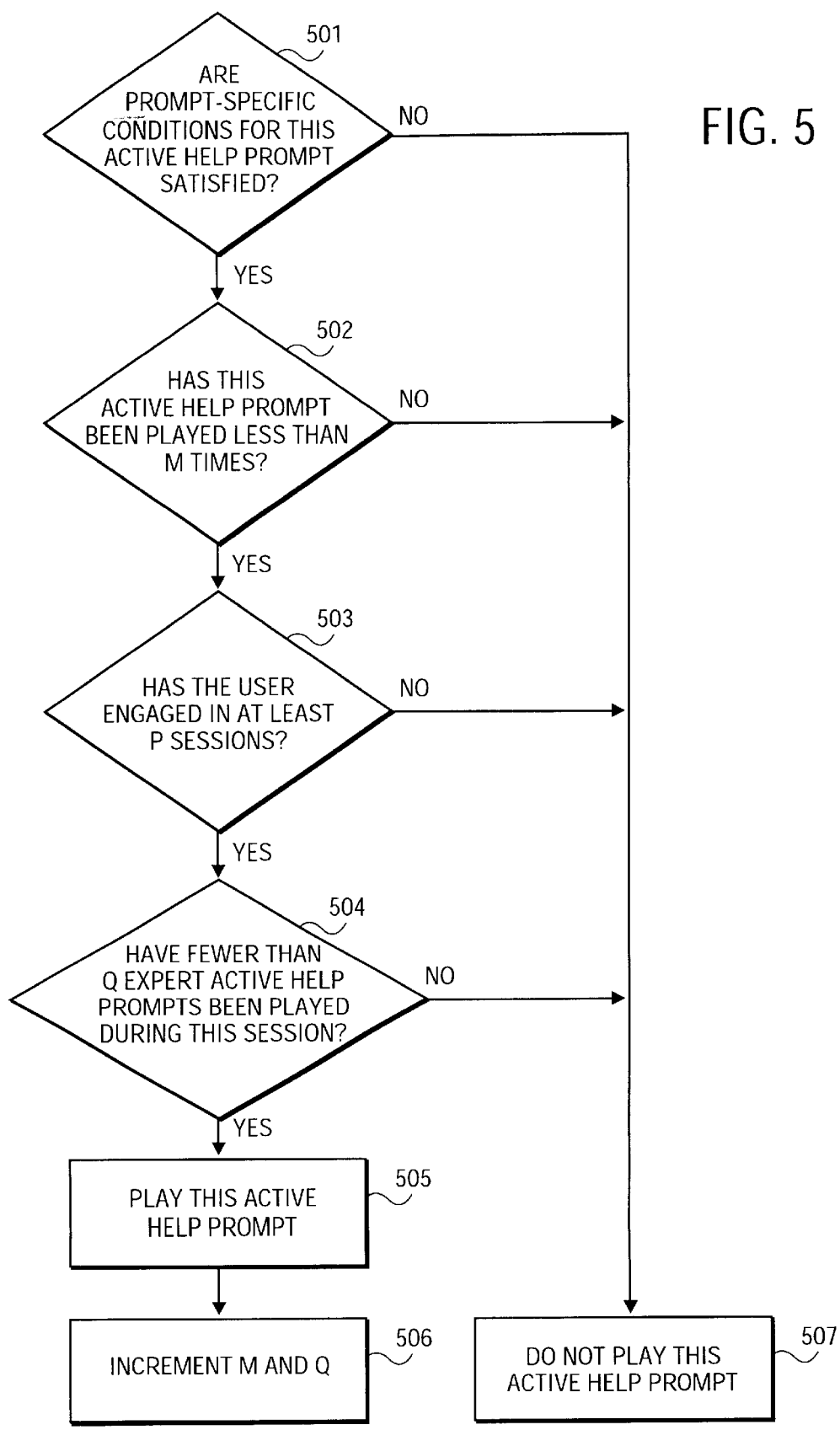
FIG. 5 is a flow diagram showing a process by which an expert active help prompt may be played.

FIG. 5 illustrates one process that may be performed, according to which an expert active help prompt may be played. The illustrated process is set forth in terms of a generic expert prompt; specific examples of expert prompts are described below. At 501, the prompt-specific conditions for this prompt, if any, are applied. Again, for certain prompts there may be no prompt-specific conditions to apply, other than the number of times the active help prompt has been played. In addition, some active help prompts may have other conditions that are not prompt-specific, such as what session the caller is on. As noted above, the prompt-specific conditions may be applied by an event listener in response to an event thrown, which in turn may be based on dialog states or other criteria. The prompt-specific conditions, if any, may involve determining the state of one or more user-specific variables and/or other variables, such as those mentioned above. If the prompt-specific conditions are not met, then the prompt will not be played (507) in response to this triggering event. If the prompt-specific conditions are met, then at 502 a determination is made of whether this active help prompt has been played fewer than M times, where M is a predetermined, configurable number (e.g., one). If this active help prompt has been played M or more times, the active help prompt is not played (507). If the active help prompt has been played fewer than M times, then a determination is made at 503 of whether the user has engaged in at least P sessions with the voice-enabled application, where P is a predetermined, configurable number (e.g., three). If the user has engaged in fewer than P sessions, the prompt is not played (507). If the user has engaged in at least P sessions, then a determination is made at 504 of whether fewer than Q expert active help prompts have already been played during the current session, where Q is a predetermined, configurable number (e.g., one). If at least Q expert active help prompts have already been played during this session, then the active help prompt is not played (507). If all of the aforementioned decisions (501 through 504) are answered affirmatively, then the active help prompt is played at 505, and then M and Q are each incremented by one at 506.

The following table lists some specific examples of active help prompts that may be used and, for each prompt, the type of prompt (novice or expert), its purpose, and the content of the prompt. Of course, many other active help prompts are possible.

| Prompt Name | Type | Purpose | Prompt Content |
| --- | --- | --- | --- |
| Verification Earcon | Novice | To teach callers what the verification earcon means. | "Your voice has already been verified this session. From now on, when I check your identity and I already know who you are, you'll hear this sound." |
| Voice Links | Novice | To teach callers about voice links. | "Here's a tip: While browsing, you may hear a word or phrase between two sounds, like this [voicelinkStart] Weather Report [voicelinkEnd]. If you repeat this word or phrase, I'll take you there. This is called a voice link." |
| Hotword From Content | Novice | To teach callers about the hotword | "Say 'VOYAGER' when you want my attention." |
| How to Bookmark | Expert | To teach callers how to create bookmarks. | "Welcome back. Now that you've done some browsing, you might want to add one of the places you've visited to your bookmarks. To learn how to do this, say 'help with bookmarks'." |
| Learn to Navigate - Repeated Bookmark | Expert | To teach caller about navigational commands 'go back' and 'go forward'. | "Here's a tip: Instead of asking for a bookmark twice in one session, you can revisit the places you've gone by saying 'go back'. Once you've gone back, you can also say 'go forward'." |
| Learn to Navigate - Never Used | Expert | To teach caller about navigational commands 'go back' and 'go forward'. | "Now that you've done some browsing, here's a quick tip. You can revisit the places you've gone this session by saying 'go back'. Once you've gone back, you can also say 'go forward'." |
| Transfer | Novice | To inform the caller that the call will transfer the call out of the Voyager system. | "Before I place this call for you, I just want you to know that this transfer will end your session. You can say 'cancel' right now if you want . . . Thanks for using Voyager." |

-continued

| Prompt Name | Type | Purpose | Prompt Content |
| --- | --- | --- | --- |
| Trombone | Novice | To teach the caller about the hotword to return to the voice browser from the phone call. | "When you're done with this call, you don't have to hang up. Just say VOYAGER to get back." |
| First Time At Bookmarks No Bookmarks Some Preloaded | Novice | To explain to the caller what the bookmarks are. (Caller has NOT added any bookmarks. There are preloaded bookmarks). | "Welcome to your bookmarks. Bookmarks allow you to jump instantly to a place without having to take several steps to get there. Right now you have X bookmarks. These bookmarks have already been added for you. If you want to hear what they are, say 'list bookmarks'. If you want to learn how to add your own, say 'help with bookmarks'. What would you like to do?" |
| First Time At Bookmarks Some Bookmarks Some Preloaded | Novice | To explain to the caller what the bookmarks are (Caller has added bookmarks. There are preloaded bookmarks). | "Welcome to your bookmarks. Right now you have X bookmarks. Some of these have already been added for you. You can list your bookmarks or delete bookmarks. What would you like to do?" |
| First Time At Bookmarks No Bookmarks No Preloaded | Novice | To explain to the caller what the bookmarks are (Caller has NOT added bookmarks. There are NO preloaded bookmarks). | "Welcome to your bookmarks. Bookmarks allow you to jump instantly to a place without having to take several steps to get there. Right now you don't have any bookmarks. Once you have some bookmarks, you can come here to go through your bookmark list or delete any bookmarks you want. To learn how to add bookmarks say 'help with bookmarks'." |
| First Time At Bookmarks Some Bookmarks No Preloaded | Novice | To explain to the caller what the bookmarks are (Caller has added bookmarks. There are NO preloaded bookmarks). | "Welcome to your bookmarks. Right now you have X bookmarks. "You can list your bookmarks or delete bookmarks. What would you like to do?" |
| Say Bookmarks Directly | Expert | To teach callers that bookmarks are universal. | "Here's a tip: You don't have to go through bookmarks; just say the bookmark name and I'll connect you." |
| Say Delete A Bookmark | Expert | To teach callers that 'delete a bookmark' is a universal. | "Here's a tip: You don't have to go through bookmarks to get here. Just say 'delete a bookmark'." |
| Say List My Bookmarks | Expert | To teach the caller that 'list bookmarks' is a universal. | "Here's a tip: You don't have to go through bookmarks to get here. Just say 'list my bookmarks'." |
| Say Bookmark Name | Novice | To teach the caller how to invoke a bookmark after the first time they enroll one. | "Next time you want to go to [name], just say the bookmark name." |
| Describe Bookmark List | Novice | To teach the caller how to use the bookmark list. | "I'll read your bookmarks back to you one by one. You can just listen, but if you want to scroll through them faster, you can say 'next'. If you want to learn more commands for your bookmark list, say 'help'." |

-continued

| Prompt Name | Type | Purpose | Prompt Content |
|---|---|---|---|
| Offer Bookmark | Novice | To tell the caller about the bookmark list since they are asking for the list without having any bookmarks in it. | "Bookmarks allow you to jump to places without having to go through several steps to get there. To learn how to create bookmarks, say 'help with bookmarks'." |
| First Time Navigating | Novice | To inform the caller what will happen before the first time caller encounters navigation. | "As we move back, you will hear the names of the places we visited. After each name, you can either wait for me to connect you, or you can continue going back by saying 'go back'. You can also say 'go forward'." |
| First Time At Profile - Information | Novice | To teach the caller about the personal profile (caller doesn't have any information in profile) | "Welcome to your personal profile. You can edit your profile information by going to the personal profile web site. To get more information say 'help'. You can review any part of your profile right now." |
| First Time At Profile - No Information | Novice | To teach the caller about personal profile (caller doesn't have any information in profile) | "Welcome to your personal profile. You don't have anything in your profile right now, but you can add information such as your name, number and address by going to the personal profile web site. To get more information say 'help'. After you have information in your profile, you can come here to review it." |
| Add to Profile From VSOPersonalProfile | Novice | To tell the caller how to add information to profile (there is nothing in caller's profile). | "You can add information such as your name, number and address by going to the personal profile web site. To get more information say 'help'. After you have information in your profile, you can come here to review it." |
| Add to Profile From VSOProfileItem | Novice | To tell the caller how to add information to profile (after caller requested information that was not there). | "You can add this to your profile by going to the personal profile web site. To get more information say 'help'." |

For any particular active help prompt, the prompt-specific conditions (401 and 501 in FIGS. 4 and 5, respectively), if any, may be based on the state of one or more user-specific variables and/or other variables, such as those mentioned above. Of course, these prompt-specific conditions will vary from prompt to prompt, by definition. That is, the conditions will depend upon the context in which each active help prompt is to be used. Accordingly, it is unnecessary to discuss herein specific examples of the prompt-specific conditions, as such details will be readily appreciated by those skilled in the art, given the foregoing description. Nonetheless, the following examples of prompt-specific conditions may be informative.

Consider first the novice active help prompt, First Time At Bookmarks No Bookmarks Some Preloaded. The prompt-specific conditions for this prompt may be simply that the dialog state for the bookmark list has been entered. Accordingly, after determining that this condition is satisfied and then determining that this prompt has not been played before to this caller (402 in FIG. 4), the prompt is played to instruct the caller on the use of bookmarks. Similarly, the prompt-specific conditions for the novice active help prompt Say Bookmark Name may be simply that the dialog state for adding a bookmark has been exited. Accordingly, after determining that this condition is satisfied and then determining that this prompt has not been played before to this caller, the prompt is played to instruct the caller on how to activate the just-added bookmark.

Consider next the expert active help prompt, Say Bookmarks Directly. The prompt-specific conditions for this prompt may include, for example, the condition that caller has said "bookmarks" immediately followed by a name (as indicated by the appropriate user-specific variable) at least some predetermined number of times. The predetermined number may be a default. Accordingly, after determining that this condition is satisfied and then checking the conditions 502 through 504 (FIG. 5), the prompt is played to the caller to instruct the caller that he need not ask for his list of bookmarks as a prerequisite to activating a bookmark.

As another example, consider the expert active help prompt, Learn to Navigate—Never Used. The prompt-specific conditions for this prompt may include, for example: 1) the caller has requested content at least some predetermined number of times (i.e., there are three or more items in his history list); and 2) the caller has not used any of the navigational commands (e.g., "go back" or "go forward") in any session. Accordingly, after determining that these conditions are satisfied and then checking conditions 502 through 504, this active help prompt is played to the caller to instruct the caller on the use of the navigational commands.

Thus, a method and apparatus for providing active help to a user of a voice-enabled application have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of providing active help to a user of a voice-enabled application, the method comprising:
    maintaining a usage history of the user, the usage history including a plurality of user-specific variables;
    monitoring dialog states during a session of the user;
    generating an event in response to a specified transition between two dialog states corresponding to speech from the user;
    checking a set of conditions using a set of the plurality of user-specific variables in response to the event; and
    playing a prompt containing information on a specific help topic to the user in response to the set of conditions being satisfied.

2. A method as recited in claim 1, wherein at least some of the user-specific variables are applicable across a plurality of sessions.

3. A method as recited in claim 2, wherein said checking the set of conditions comprises checking the set of conditions using at least one of the user-specific variables that is applicable across a plurality of sessions.

4. A method as recited in claim 1, wherein the usage history comprises a history of use of the voice-enabled application by the user.

5. A method as recited in claim 4, wherein the usage history comprises a history of dialog states.

6. A method as recited in claim 5, wherein the voice-enabled application is a voice browser.

7. A method as recited in claim 1, wherein the set of conditions includes the condition that the user has engaged in at least a predetermined number of sessions.

8. A method as recited in claim 1, wherein the set of conditions includes:
    the condition that the active help prompt has previously been played to the user no more than a predetermined number of times; and
    the condition that the user has engaged in at least a predetermined number of sessions.

9. A method as recited in claim 1, wherein said playing the prompt comprises playing an audio prompt as speech.

10. A method of providing active help to a user of a voice-enabled application, the method comprising, in the voice-enabled application:
    maintaining a history of dialog states of the user, wherein said maintaining the history includes maintaining a plurality of user-specific variables, at least some of the user-specific variables being applicable across a plurality of sessions for the user, each of the sessions characterized by one or more dialog states;
    monitoring dialog states during a session;
    detecting an event based on the dialog states;
    checking a set of conditions using a set of the plurality of user-specific variables in response to detecting the event; and
    playing an audio prompt containing information on a specific help topic to the user in response to the set of conditions being satisfied.

11. A method as recited in claim 10, wherein the voice-enabled application is a voice browser for providing the user with access to voice-enabled content on a network of voice-enabled sites.

12. A method as recited in claim 10, wherein said checking the set of conditions comprises checking the set of conditions using at least one of the user-specific variables that is applicable across a plurality of sessions.

13. A method as recited in claim 10, wherein the set of conditions includes the condition that the active help prompt has previously been played to the user no more than a configurable, predetermined number of times.

14. A method as recited in claim 10, wherein the set of conditions includes the condition that the user has engaged in at least a predetermined number of sessions.

15. A method as recited in claim 10, wherein the set of conditions includes:
    the condition that the active help prompt has previously been played to the user no more than a configurable, predetermined number of times; and
    the condition that the user has engaged in at least a predetermined number of sessions.

16. A method as recited in claim 10, wherein said playing the audio prompt comprises playing the audio prompt as speech.

17. A method as recited in claim 10, further comprising throwing the event in response to entry to or exit from a specified dialog state.

18. A method as recited in claim 10, further comprising throwing the event in response to a specified transition between two dialog states.

19. A method of providing a user with access to voice-enabled content on a network of voice-enabled sites, the method comprising:
    providing a voice browser application to allow a user to access voice-enabled content on the voice-enabled sites using voice commands;
    maintaining a history of dialog states associated with the user, wherein said maintaining the history includes maintaining a plurality of user-specific variables, at least some of the user-specific variables being applicable across a plurality of sessions for the user, each of the sessions characterized by one or more dialog states;
    maintaining a plurality of active help prompts capable of being played to a user as speech, each active help prompt containing information on a different, specific help topic;
    maintaining a plurality of sets of conditions, each set of conditions corresponding to a different one of the active help prompts;
    monitoring dialog states during a session;
    detecting an event based on the dialog states in response to speech from the user;
    checking a set of conditions of said plurality of sets of conditions using a set of the plurality of user-specific variables in response to detecting the event; and
    in response to the applied set of conditions being satisfied, playing to the user the active help prompt corresponding to the applied set of conditions.

20. A method as recited in claim 19, wherein said checking a set of conditions comprises checking the set of conditions using at least one of the user-specific variables that is applicable across a plurality of sessions.

21. A method as recited in claim 19, wherein said monitoring dialog states comprises operating a listener to detect a thrown event.

22. A method as recited in claim 19, wherein the applied set of conditions includes the condition that the active help prompt has previously been played to the user no more than a configurable, predetermined number of times.

23. A method as recited in claim 19, wherein the set of conditions includes the condition that the user has engaged in at least a predetermined number of sessions.

24. A method as recited in claim 19, wherein the set of conditions includes:

the condition that the active help prompt has previously been played to the user no more than a configurable, predetermined number of times; and the condition that the user has engaged in at least a predetermined number of sessions.

25. A method as recited in claim 19, wherein the plurality of active help prompts are categorized into a plurality of categories, including an expert help category and a novice help category, and wherein the prompts within each category have one or more conditions in common.

26. A method as recited in claim 25, wherein each active help prompt in the expert help category has associated therewith the condition that the user has engaged in at least a predetermined number of sessions.

27. A method as recited in claim 19, further comprising throwing the event in response to entry to or exit from a specified dialog state.

28. A method as recited in claim 19, wherein further comprising throwing the event in response to a specified transition between two dialog states.

29. A method of providing active help to a user of a voice browser, the voice browser for providing the user with access to voice-enabled content on a network of voice-enabled sites, the method comprising, in the voice browser:

maintaining a history for the user, wherein said maintaining the history includes maintaining a plurality of user-specific variables, at least some of the user-specific variables being applicable across a plurality of sessions for the user, each of the sessions characterized by one or more dialog states;

maintaining a plurality of active help prompts capable of being played to a user as speech, each active help prompt containing information on a different, specific help topic, wherein the plurality of active help prompts are categorized into a plurality of categories, including an expert help category and a novice help category;

maintaining a plurality of sets of conditions, each set of conditions corresponding to a different one of the active help prompts, wherein the active help prompts within each said category share one or more conditions of said sets of conditions, and wherein each active help prompt in the expert help category has the condition that the user has engaged in at least a predetermined number of sessions;

monitoring dialog states during a session;

detecting an event based on the dialog states in response to speech from the user;

checking a set of conditions of said plurality of sets of conditions using a set of the plurality of user-specific variables in response to detecting the event, including checking the set of conditions using at least one of the user-specific variables that is applicable across a plurality of sessions; and in response to the applied set of conditions being satisfied, playing to the user the active help prompt corresponding to the applied set of conditions.

30. A method as recited in claim 29, wherein said monitoring dialog states comprises operating a listener to detect the event.

31. A method as recited in claim 29, wherein the applied set of conditions includes the condition that the active help prompt has previously been played to the user no more than a configurable, predetermined number of times.

32. A method as recited in claim 29, further comprising generating the event in response to entry to or exit from a specified dialog state.

33. A method as recited in claim 29, further comprising generating the event in response to a specified transition between two dialog states.

34. An apparatus for providing active help to a user of a voice-enabled application, the apparatus comprising:

means for maintaining a usage history of the user, the usage history including a plurality of user-specific variables;

means for monitoring dialog states during a session of the user;

means for generating an event in response to a specified transition between two dialog states corresponding to speech from the user;

means for checking a set of conditions using a set of the plurality of user-specific variables in response to the event; and means for playing a prompt containing information on a specific help topic to the user in response to the set of conditions being satisfied.

35. An apparatus as recited in claim 34, wherein at least some of the user-specific variables are applicable across a plurality of sessions for the user.

36. An apparatus as recited in claim 35, wherein said means for checking the set of conditions comprises means for checking the set of conditions using at least one of the user-specific variables that is applicable across a plurality of sessions.

37. An apparatus as recited in claim 34, wherein said usage history comprises a history of use of the voice-enabled application by the user.

38. An apparatus as recited in claim 34, wherein the voice-enabled application is a voice browser.

39. An apparatus as recited in claim 34, wherein the set of conditions includes the condition that the user has engaged in at least a predetermined number of sessions.

40. An apparatus as recited in claim 34, wherein the set of conditions includes:

the condition that the active help prompt has previously been played to the user no more than a configurable, predetermined number of times; and the condition that the user has engaged in at least a predetermined number of sessions.

41. An apparatus as recited in claim 34, wherein said means for playing the prompt comprises means for playing an audio prompt as speech.

42. A processing system connected on a network of voice-enabled sites, the processing system comprising:

a processor;

a network interface to connect the processing system to the network;

an audio interface through which speech from a user is received and audio prompts to the user are played; and a storage facility having stored therein sequences of instructions which, when executed by the processor, result in the processing system:

provide a voice browser application to allow a user to access voice-enabled content on the voice-enabled sites using voice commands;

maintaining a history of use of the application by the user, including maintaining a plurality of user-specific variables, at least some of the user-specific variables being applicable across a plurality of sessions for the user, each of the sessions characterized by one or more dialog states;

monitoring dialog states during a session;

detecting an event based on the dialog states;

checking a set of conditions using a set of the plurality of user-specific variables in response to detecting the event; and playing an audio prompt containing information on a specific help topic to the user in response to the set of conditions being satisfied.

43. A processing system as recited in claim 42, wherein said checking the set of conditions comprises checking the set of conditions using at least one of the user-specific variables that is applicable across a plurality of sessions.

44. A processing system as recited in claim 42, wherein said monitoring dialog states comprises operating an event listener to detect the event.

45. A processing system as recited in claim 42, wherein the history of use comprises a history of dialog states.

46. A processing system as recited in claim 42, wherein the set of conditions includes the condition that the user has engaged in at least a predetermined number of sessions.

47. A processing system as recited in claim 42, wherein the set of conditions includes:

the condition that the active help prompt has previously been played to the user no more than a configurable, predetermined number of times; and the condition that the user has engaged in at least a predetermined number of sessions.

48. A processing system as recited in claim 42, wherein said playing the audio prompt comprises playing the audio prompt as speech.

49. A processing system as recited in claim 42, further comprising throwing the event in response to entry to or exit from a specified dialog state.

50. A processing system as recited in claim 42, further comprising throwing the event in response to a specified transition between two dialog states.

51. A machine-readable program storage medium having stored therein sequences of instructions which, when executed by a machine, cause the machine to perform a method of providing active help to a user of a voice browser, the voice browser for providing the user with access to voice-enabled content on a network of voice-enabled sites, the method comprising, in the voice browser:

maintaining a history of dialog states associated with the user, wherein said maintaining the history includes maintaining a plurality of user-specific variables, at least some of the user-specific variables being applicable across a plurality of sessions for the user, each of the sessions characterized by one or more dialog states;

monitoring dialog states during a session;

generating an event based on the dialog states;

detecting the event;

checking a set of conditions using a set of the plurality of user-specific variables in response to detecting the event; and playing an audio prompt containing information on a specific help topic to the user in response to the set of conditions being satisfied.

* * * * *